United States Patent [19]

Krueger et al.

[11] 4,206,980
[45] Jun. 10, 1980

[54] REVERSIBLY TRANSPARENT-TRANSLUCENT FILM AND METHOD OF MAKING SAME

[75] Inventors: Dennis L. Krueger, Hudson Township, St. Croix County; Richard L. Volgren, Balsam Lake Township, Polk County, both of Wis.

[73] Assignee: Minnesota Mining and Manufacturing Company, Saint Paul, Minn.

[21] Appl. No.: 899,239

[22] Filed: Apr. 24, 1978

[51] Int. Cl.² .............................................. B29D 27/00
[52] U.S. Cl. ................................................. 350/359
[58] Field of Search ................ 350/359, 360, 362, 363

[56] References Cited

U.S. PATENT DOCUMENTS

| 2,627,938 | 2/1953 | Frehmader et al. |
|---|---|---|
| 3,034,395 | 5/1962 | Zandman |
| 3,043,793 | 7/1962 | Meries et al. |
| 3,081,276 | 3/1963 | Snyder et al. |
| 3,132,027 | 5/1964 | Norton et al. |
| 3,201,364 | 8/1965 | Salyer |
| 3,308,073 | 3/1967 | Kepple |
| 3,664,981 | 5/1972 | Mahlman |
| 3,671,105 | 6/1972 | Williams et al. ............. 350/359 |
| 3,954,927 | 5/1976 | Duling et al. |

*Primary Examiner*—William L. Sikes
*Attorney, Agent, or Firm*—Cruzan Alexander; Donald M. Sell; Richard Francis

[57] ABSTRACT

Normally transparent films which can be rendered translucent by stretching and transparent by relaxing the film are provided. The films comprise a blend of crystallizable polymer with a compound with which the polymer is miscible at a temperature above the crystallization temperature of the crystallizable polymer-compound blend but immiscible at a temperature below the crystallization temperature of the blend. The films are prepared by blending the crystallizable polymer with the compound under melt conditions, casting a film of the blend and cooling to solidify the blend.

13 Claims, No Drawings

REVERSIBLY TRANSPARENT-TRANSLUCENT FILM AND METHOD OF MAKING SAME

BACKGROUND OF THE INVENTION

1. Field of the Invention

This invention relates to transparent films which can be rendered translucent by stretching and rendered transparent again by releasing the film. The invention also relates to a method of making such films.

2. Description of the Prior Art

Transparent films comprised of blends of crystalline polymers and various constituents are known. U.S. Pat. No. 3,132,027 teaches the preparation of transparent films suitable for packaging by melt-coating the article to be packaged with a blend of a polymer having greater than 30 percent crystallinity with up to 20 percent of an oil and rapidly quenching the coating. The patent further teaches that only when quenching is rapid (as when melt-coated articles are plunged into an ethanol bath at $-25°$ C.) are transparent films obtained. When the melt-coated article is allowed to cool slowly, the coatings obtained are undesirably cloudy and intolerably fragile.

Transparent films of a blend of mineral oil and polyolefin are described in U.S. Pat. No. 3,201,364. This patent teaches that polypropylene compositions having improved flexibility and toughness at both room temperature and below $0°$ C., yet retaining a large measure of high temperature properties, are obtained by incorporating into isotactic polypropylene from 5 to 50% of a solvating plasticizer such as mineral oil. Still other compositions of polyolefins and such constituents are described in U.S. Pat. Nos. 3,043,793, and 3,664,981. These patents teach compositions suitable for making resilient, flexible molded articles and transparent films. None of these patents teach the preparation of transparent films which can be rendered translucent by stretching and then transparent by releasing the stretching force.

U.S. Pat. No. 3,308,073 describes a porous film useful as a filter for gasoline and the like fluids which is prepared by heating a mixture of 4 to 40 percent polyolefin and 96 to 60 percent of a hydrocarbon liquid to form a homogeneous liquid, solidifying the mixture in the form of a 5 to 100 mil (125 to 2500 microns) layer, and removing the hydrocarbon liquid by evaporation. There is no teaching that the solidified layer would be a transparent film that could be rendered translucent by stretching. Additionally, because of the low concentration of polyolefin, such film would be extremely weak.

SUMMARY OF THE INVENTION

In accordance with this invention, there is provided a transparent film which can be rendered translucent by application of stretching strain and returned to the transparent state by removing the strain. The film of the invention comprises 40 to 85 parts by weight of a crystallizable polymer and correspondingly 60 to 15 parts by weight of a compound in which the polymer is miscible at a temperature above the crystallization temperature of the crystallizable polymer compound blend but immiscible at a temperature below the crystallization temperature of the blend.

The film is prepared by heating the blend to a temperature above the melting temperature of the crystallizable polymer to form a solution of crystallizable polymer in the compound, casting the solution as a layer and cooling the layer at a proper rate at a temperature in the range of about $50°$ C. to $170°$ C. below the melting point of the crystalline polymer as is further explained herein. To achieve the proper cooling rate, the layer thickness should be less than about 500 microns with use of a one-sided cooling system, e.g., a casting wheel, and less than about 1000 microns with use of a two-sided cooling system, e.g., a quench bath.

While not wanting to be bound by theory, it is believed that translucentization of the films of the invention is not an effect of crazing or cracking but rather an effect of stretching. The films of the invention are apparently made up lamellae, spherulites, and aggregates of spherulites of crystalline polymer molecules held together by tie molecules and microfibrils between the lamellae, spherulites and aggregates, with additive compound occupying the space around the microfibrils and the tie molecules. On stretching, the lamellae, spherulites and aggregates are pulled apart, forming voids which fill with air and diffract light to interfere with the transparency of the film. The tie molecules and microfibrils do not appear to be broken by the stretching strain and appear to elastically recover to their original position when the strain is released.

DETAILED DESCRIPTION OF THE INVENTION

Crystallizable polymers suitable for use in the preparation of films of the invention include any thermoplastic polymer or mixture of two or more compatible thermoplastic polymers that have at least 5% by weight crystallinity, as detected by X-ray radiation diffraction pattern. Suitable polymers will also possess a tensile strength of at least about 70 kg/cm$^2$ (1000 psi).

Examples of suitable crystallizable polymers include addition polymers such as polyolefins, polyvinyl ethers, polyalkylene oxides and condensation polymers such as polyesters, polyamides and polyacetals. Useful polyolefins include the polymers of ethylene, propylene, isobutylene, 1-octene, styrene, isoprene, chloroprene, and the like, and copolymers of two or more such olefins that may be polymerized to contain crystalline and amorphous segments and mixtures of stereospecific modification of such polymers, e.g., mixtures of isotactic polypropylene and atactic polypropylene, isotactic polypropylene and atactic poly-1-octene, isotactic polystyrene and atactic polypropylene. Useful polyvinylethers include polyvinyl methyl ether and polyvinyl butyl ether that contain crystalline and amorphous regions and mixtures of sterospecific modifications of such polymers. A useful polyalkyleneoxide is polypropylene oxide. Useful polyesters include polyethylene-terephthalate, polyhexamethyleneadipate, polyhexamethylenesuccinate and poly(4,4'-isopropylidenediphenylene carbonate). Useful polyamides include polyhexamethyleneadipamide, polyhexamethylenesebacamide and polycaprolactam. An examplary useful polyacetal is polyformaldehyde.

Compounds suitable for blending with the crystallizable polymer to films of the invention are liquids or solids at room temperature in which the crystallizable polymer will dissolve or form a homogeneous dispersion at the melting temperature of the crystallizable polymer but from which the crystallizable polymer will separate on cooling to a temperature below the melting temperature of the crystallizable polymer. Preferably, these compounds have a boiling point at atmospheric pressure at least as high as the melting temperature of the crystallizable polymer. Compounds having lower boiling points may be used in those instances where superatmospheric pressure may be employed to elevate the boiling point of the compound to a temperature at least as high as the melting temperature of the crystallizable polymer. Generally, suitable compounds have a solubility parameter and a hydrogen bonding parameter within a few units of the values of these parameters for the crystallizable polymer.

Suitable compounds for blending may be selected on the basis of a simple test having the following sequence of steps:

1. Determine the solubility parameter of a given crystallizable polymer, either by calculations or consultation of any of a number of references, e.g., Kirk-Othmer, "Encyclopedia of Polymer Science and Technology", Vol. 12, pages 618 et seq.

2. Select from a reference giving the solubility parameter of the blending compounds, a compound having a solubility parameter within about two units of the solubility parameter of the crystallizable polymer and having a boiling point at least as high as the melting point of the crystallizable polymer.

3. Mix equal portions by weight of the crystallizable polymer and the blending compound under test (generally a gram or so of each material is sufficient).

4. Heat while gently stirring the mixture to at least the melting point of the crystallizable polymer and observe whether the mixture becomes miscible.

5. Allow the mixture to cool slowly and observe whether two interdispersed phases form or whether the mixture remains as one phase.

Compounds are suitable as the blending compound if in Step 4 the mixture is miscible and in Step 5 the mixture separates into two interdispersed phases.

Examples of compositions of crystallizable polymer and blending compound which meet the above test requirements and which are suitable for use in the preparation of the films of the invention include: (1) the crystallizable polymer, polypropylene ($\delta=9.3$) and any one of the following blending compounds: diisodecyl phthalate ($\delta=7.2$), n-decane ($\delta=7.6$), mineral oil ($\delta=7.6$), n-hexadecane ($\delta=8.0$), butyl methacrylate ($\delta=9.3$), pine oil ($\delta=8.6$), butyl acrylate ($\delta=8.8$), hydrogenated terphenyl ($\delta=9.0$), dibutyl phthalate ($\delta=9.3$), 2-ethyl-1-hexanol ($\delta=10.5$), anthracene ($\delta=10.9$) or methyl salicylate ($\delta=10.6$); (2) the crystallizable polymer, polyethylene terephthalate ($\delta=10.0$) and any one of the following blending compounds: diethylene glycol ($\delta=10.0$), dipropylene glycol ($\delta=10.1$), triethylene glycol, dibutyl phthalate ($\delta=10.8$), methyl salicylate ($\delta=10.6$), dimethyl phthalate ($\delta=11.0$), benzyl alcohol ($\delta=12.0$), or tetrabromoethane ($\delta=11.7$); (3) the crystallizable polymer, poly(vinylidene fluoride) ($\delta=9.9$) and any one of the blending compounds listed above for polypropylene; and (4) the crystallizable polymer, poly(hexamethylene adipamide) ($\delta=14.0$) and either hydrogenated terphenyl ($\delta=9.0$) or triethylene glycol ($\delta=10.7$) as a blending compound.

The films of the invention are prepared by casting a layer of a melt of a crystallizable polymer and a blending compound and, depending on the particular polymer, cooling the layer on a heat sink at an appropriate temperature preferably between about 135° and 170° C. below the melting temperature of the crystallizable polymer to provide a proper cooling rate. (For example, for polypropylene having a melting point of 176° C., a cooling temperature between about 15° C. to 50° C. is employed.) The appropriate temperature for polyethylene is between about 50° C. and about 170° C. below its melting temperature. For any other crystallizable polymer, the appropriate temperature is between about 135° C. and about 170° C. below its melting temperature.

The melt is prepared by mixing 40 to 85 percent by weight of crystallizable polymer and correspondingly 60 to 15 percent by weight of blending compound and heating the mixture to at least the melting point of the crystallizable polymer. For ease of handling the melt and in its casting, it is convenient to heat the mixture to 25° C. to about 100° C. above the melting point of the crystallizable polymer.

The attainment of the films of the invention is dependent on the cooling temperature and the rate of cooling. During cooling, heat is removed from the melt until the melting temperature of the crystallizable polymer is reached and crystallization of the polymer can begin. Cooling temperatures greater than about 170° C. below the melting point of the crystallizable polymer causes too raid quenching of the melt and results in films which, although strong and transparent (as taught in the prior art), are substantially incapable of being rendered translucent by stretching and cannot be repeatedly rendered translucent and transparent by alternate stretching and relaxing. Cooling at temperatures of less than about 135° C. (or 50° C. in the case of polyethylene) below the melting point of the crystallizable polymer allows for a too slow crystallization of the crystallizable polymer with formation of large spherulites that results in films which are weak and generally permanently translucent and which do not show the reversible translucent-transparent phenomenon of the films of the invention. Casting films which are too thick to achieve the proper cooling rate as described above also allows for a too slow crystallization.

Generally, the melt is obtained by feeding into the hopper of an extruder a mixture of crystallizable polymer and blending compound through the extruder which is heated to a slot die that has a width of 25 to 1000 microns. Preferably, the crystallizable polymer is fed into the hopper of the extruder and the blending compound is fed into the extruder via a port in the extruder wall intermediate the hopper and the extruder exit. It is also preferable to utilize a static mixer between the extruder exit and the slot die. In passing through the extruder, and, where used, the static mixer, the mixture of polymer and blending compound is heated to a temperature at or at least about 25° C. above the melting point of the crystallizable polymer and mixed to form a solution or homogeneous dispersion that is extruded through the slot die as a layer 25 to 1000 microns thick onto a casting roller, maintained at a temperature of about 135° C. to 170° C. (50° C. to 170° C. in the case of polyethylene) below the melting temperature of the crystallizable polymer (e.g., 15° C. to 50° C. for polypropylene) by the flow of a suitable coolant, e.g., water. The cooled film is then led from the casting roller to a take-up roller.

The films of the invention possess a tensile strength of at least about 35 kg/cm$^2$ (500 psi), more often 150 kg/cm$^2$ (2,100 psi) or higher depending on the tensile strength of the crystallizable polymer used.

The films are converted from the transparent state to the translucent state by stretching in a range of that required to obtain a one percent area increase to a point beyond which elastic recovery will not take place, called the elastic limit. Typically, the elastic limit is achieved with stretching in excess of about 10% of the area. The actual amount of stretching required will depend on the particular composition of the film. Stretching may be provided by any suitable device which can provide stretching in at least one direction and may provide stretching both in that direction and in the transverse direction. Stretching should be uniform to obtain uniform translucency. Permanent deformation and translucency occurs if the film is stretched beyond its elastic limit.

The films of the invention may be employed in any of a wide variety of situations where their transparent-translucent properties can be employed. For example, the films may be employed as window shades which would be transparent when needed but may be rendered translucent by stretching if the need may arise, e.g., when the sun begins to shine into the window. Such a window shade would not have to be raised and lowered. It would be a parmanent installation on the window frame, fitted with a suitable stretching device. Films of the invention may also be employed as shades for greenhouses.

The films of the invention can be modified without departing from the scope of the claims. For example, compatible coloring materials may be added to the melt comprising the crystallizable polymer and the additive compound to impart a permanent coloring to the film. Additionally, the films of the invention may be laminated to other elastic transparent films to provide composite film structures. This may be beneficial in situations where the properties of the additive film are desired in the resultant composite film. For example, films having a greater tear strength or greater tensile strength may be laminated to the films of the invention.

EXAMPLES

The invention is further illustrated by reference to the following examples wherein all parts are by weight unless otherwise specified.

EXAMPLE 1

Crystalline polypropylene (available under the trade designation "Profax" Type 6330 from Hercules, Inc.) having an average crystallinity of 45% and a melting point of about 176° C. and mineral oil (available under the trade designation "Nujol" from Plough, Inc.) having a boiling point about 200° C. and a standard Saybolt viscosity of 360–390 at 100° F. (about 80 centistokes) were fed into a plastic extruder at 7.5 pounds per hour (3.4 kilograms per hour) and 3.1 pounds per hour (1.4 kilograms per hour) respectively. Between the exit port of the extruder and a seven inch (17.75 centimeter) casting type slit die there was placed a six inch (15 centimeter) static mixer. The static mixer was maintained at 260° C. and the extruder at a maximum temperature of about 255° C. Material exiting from the die, at a temperature of about 240°–245° C., was immediately contacted with a casting roll having a surface held at a temperature of 25° C. (about 150° below the melting point of the polypropylene) and revolving at a speed such that a film 200 microns thick was obtained. The film obtained was transparent and, when it was stretched 5 percent in length, it became translucent. On relaxation of the stretching force, the film immediately regained its transparent state. The alternating stretching and relaxing of the film to render it translucent and transparent respectively could be repeated many times, e.g., more than 100,000 times, without any loss of its original strength.

EXAMPLE 2

Example 1 was repeated with the exception that the casting roll was maintained at 16° C. (about 160° C. below the melting point of the polypropylene). The film obtained had a tensile strength of 2200 psi (155 kg/cm$^2$) and an elongation at break of 600 percent. In the relaxed state, the film was transparent and, on stretching to 10 percent, the film was rendered translucent. After several hundred stretching-relaxing cycles, the properties of the film remained essentially unchanged.

EXAMPLE 3

Example 1 was repeated with the exception that the casting roll was maintained at 49° C. (about 127° C. below the melting point of the polypropylene). The film obtained had an elongation at break of 10 percent and a tensile strength of 650 psi. In the relaxed state, the film was transparent; and, on stretching about 3 percent, the film became translucent.

When Example 1 was repeated with the exception that the casting roll was maintained at 53° C. (about 123° C. below the melting point of the polypropylene), the film had essentially no tensile strength.

Example 1 was repeated with the exception that the casting roll was maintained at 10° C. (about 166° C. below the melting point of the polypropylene), the tensile strength of the resulting film was 2250 psi (157.5 kg/cm$^2$) and its elongation at break was 150%. The film did not exhibit the phenomenon of reversible translucentization-transparentization on stretching and relaxing.

Example 1 was repeated with the exception that the casting roll was maintained at minus 40° C. (about 216° C. below the melting point of polypropylene). The resulting film had a tensile strength of 3166 psi (222 kg/cm$^2$) and an elongation at break of 850%. The film did not exhibit the phenomenon of reversible translucentization-transparentization on respectively stretching and relaxing.

EXAMPLE 4

A mixture of 140 grams of high density polyethylene (available under the trade designation "Marlex" brand polyethylene from Phillips Petroleum Co.) having a melting point of 135° C. and 60 grams of "Nujol" mineral oil were heated to 200° C. while gently stirring. The homogeneous melt obtained was sheeted onto a 6.35 mm sheet of aluminum maintained at 0° C. The resulting film exhibited reversible translucentization-transparentization on respectively stretching and relaxing. On repeating the experiment while maintaining the aluminum block at various temperatures, films which exhibited reversible translucentization were obtained at temperatures from about −20° to about +15° C. At block temperatures below about −20° C., the films obtained could not be rendered translucent on stretching.

When the composition of Example 4 was extruded in accordance with the procedure of Example 1, films were obtained which exhibited reversible translucentization at roll temperature from 5° to 80° C.

EXAMPLE 5

A mixture of 50 grams of polyethylene terephthalate having a weight average molecular weight of 30,000 and a melting point of 256° C. with 50 grams of hydrogenated terphenyl (available under the trade designation "Therminol" 66) was stirred and heated until a homogeneous melt was obtained at about 260°–265° C. The melt was then sheeted at a thickness of about 200 microns onto an aluminum block at 65° C. The film obtained was slightly hazy, but on stretching a few percent, became translucent. On release of the stretching force, the film returned to its original hazy transparent state within a few seconds. Similar films could be obtained at temperatures up to about 95° C. At above this temperature, the films were extremely weak.

EXAMPLE 6

Example 1 was repeated with the exception that a water bath was used in place of the casting roll for cooling. The water bath was maintained at 15° C. The film quenched with this water bath was transparent in the unstretched state and, on stretching about 5%, became translucent. Relaxation of the stretching force, the film immediately regained its transparent state. The alternating stretching and relaxing of the film was repeated many times without loss of tensile strength.

EXAMPLE 7

Example 1 was repeated with the exception that 0.1% by weight nigrosine dye based on weight of mineral oil was added to the mineral oil. The resulting film had a very uniform purple hue, although it was still transparent. Upon stretching 10% the film turned a whitish purple.

What is claimed is:

1. Method of making a normally transparent film which may be rendered translucent by moderate stretching and back to transparent on relaxing, comprising:
   (a) melt blending 40 to 85 parts by weight of the thermoplastic polymer having at least 5% crystallinity with correspondingly 60 to 15 parts by weight of a compound in which said polymer will dissolve or form a homogeneous dispersion at the melting temperature of said polymer but from which said polymer will separate on cooling to a temperature below the melting temperature of said polymer;
   (b) forming a sheet of the melt blend no greater than about 1000 microns thick when the sheet is to be cooled from both sides or no greater than 500 microns thick when the sheet is to be cooled from only one side; and
   (c) cooling said sheet molten state on a cooling surface maintained at a temperature between about 50° C. and 170° C. below the melting temperature of said polymer where said polymer is polyethylene and at a temperature between about 135° C. and 170° C. for other thermoplastic polymers to form said transparent film.

2. The method of claim 1 wherein said sheet is from about 25 to about 250 microns thick.

3. The method of claim 1 wherein said polymer has a tensile strength of at least 70 kg/cm$^2$.

4. The method of claim 1 wherein said sheet is cooled from one major surface by contact with a cooling surface.

5. The method of claim 1 wherein said sheet is cooled from both major surfaces by immersion into a cooling fluid.

6. The film produced by the method of claim 1.

7. A normally transparent film which may be rendered translucent by moderate stretching and back to transparent on relaxing, comprising a quenched sheet comprising 40 to 85 parts by weight of a thermoplastic polymer having at least 5% crystallinity and 15 to 60 parts by weight of a compound in which said polymer will dissolve or form a solution at the melting temperature of said polymer but from which said polymer will separate on cooling to a temperature below the melting temperature of said polymer.

8. The film of claim 7 wherein said polymer is selected from a group consisting of polyolefins, polyvinyl ethers, polyalkylene oxides, polyesters, polyamides and polyacetals.

9. The film of claim 7 wherein said polymer is polypropylene and said compound is selected from the group consisting of dissodecyl phthalate, n-decane, mineral oil, n-hexadecane, butyl methacrylate, pine oil, butyl acrylate, hydrogenated terphenyl, dibutyl phthalate, 2-ethyl-1-hexanol, anthracene and methyl salicylate.

10. The film of claim 7 wherein said polymer is polyethylene terephthalate and said compound is selected from the group consisting of diethylene glycol, dipropylene glycol, triethylene glycol, dibutyl phthalate, methyl salicylate, dimethyl phthalate, benzyl alcohol and tetrabromethane.

11. The film of claim 7 wherein said polymer is poly(vinylidene fluoride) and said compound is selected from the group consisting of diisodecyl phthalate, n-decane, mineral oil, n-hexadecane, butyl methacrylate, pine oil, butyl acrylate, hydrogenated terphenyl, dibutyl phthalate, 2-ethyl-1-hexanol, anthracene and methyl salicylate.

12. A normally transparent film which may be rendered translucent by moderate stretching and back to transparent on relaxing, comprising a quenched sheet comprising 40 to 85 parts by weight of a polyethylene having at least 5% crystallinity and 15 to 60 parts by weight of mineral oil.

13. The film of claim 7 wherein said polymer is poly(hexamethylene adipamide) and said compound is selected from the group consisting of hydrogenated terphenyl or triethylene glycol.

* * * * *